US009445244B1

(12) United States Patent
Tolbert et al.

(10) Patent No.: US 9,445,244 B1
(45) Date of Patent: Sep. 13, 2016

(54) TECHNIQUES TO COMMUNICATE MESSAGES UTILIZING A COMMON TELEPHONE NUMBER

(71) Applicant: Bandwidth.com, Inc., Raleigh, NC (US)

(72) Inventors: Daniel Tolbert, Raleigh, NC (US); Grant Forrest, Raleigh, NC (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 15/137,518

(22) Filed: Apr. 25, 2016

(51) Int. Cl.
*H04Q 11/00* (2006.01)
*H04L 12/50* (2006.01)
*H04W 4/08* (2009.01)
*H04W 4/12* (2009.01)

(52) U.S. Cl.
CPC ............... *H04W 4/08* (2013.01); *H04W 4/12* (2013.01)

(58) Field of Classification Search
CPC ..................................................... H04W 4/08
See application file for complete search history.

(56) References Cited

U.S. PATENT DOCUMENTS

| 2009/0143052 | A1* | 6/2009 | Bates | G06F 17/30575 455/414.2 |
| 2013/0138786 | A1* | 5/2013 | Ji | H04L 65/1016 709/223 |
| 2015/0111550 | A1* | 4/2015 | Kaye | H04M 3/56 455/416 |
| 2016/0127291 | A1* | 5/2016 | Kassab | H04L 51/14 709/206 |

\* cited by examiner

*Primary Examiner* — Gerald Smarth
(74) *Attorney, Agent, or Firm* — Gregory Stephens

(57) ABSTRACT

Various embodiments are generally directed to an apparatus, method and other techniques to receive a message directed towards a common telephone number, the common telephone number to enable communications between attendee devices and organizer devices. Embodiments also include techniques to determine whether the message is received from an attendee device or an organizer device based on a telephone number associated with the message and the device that sent the message. Further, in response to determining that the message is received from an attendee device, send the message to one or more organizer devices, and in response to determining that the message is received from an organizer device, send the message to all attendee devices or a specific attendee device based on information in the message.

24 Claims, 10 Drawing Sheets

600

RECEIVE A MESSAGE DIRECTED TOWARDS A COMMON TELEPHONE NUMBER, THE COMMON TELEPHONE NUMBER TO ENABLE COMMUNICATIONS BETWEEN ATTENDEE DEVICES AND ORGANIZER DEVICES
605

DETERMINE WHETHER THE MESSAGE IS RECEIVED FROM AN ATTENDEE DEVICE OR AN ORGANIZER DEVICE BASED ON A TELEPHONE NUMBER ASSOCIATED WITH THE MESSAGE AND A DEVICE
610

IN RESPONSE TO DETERMINING THAT THE MESSAGE IS RECEIVED FROM THE ATTENDEE DEVICE, SEND THE MESSAGE TO ONE OR MORE ORGANIZER DEVICES
615

IN RESPONSE TO DETERMINING THAT THE MESSAGE IS RECEIVED FROM THE ORGANIZER DEVICE, SEND THE MESSAGE TO ALL ATTENDEE DEVICES OR A SPECIFIC ATTENDEE DEVICE BASED ON INFORMATION IN THE MESSAGE
620

FIG. 6

TECHNIQUES TO COMMUNICATE MESSAGES UTILIZING A COMMON TELEPHONE NUMBER

TECHNICAL FIELD

Embodiments described herein generally relate to techniques to communicate messages between users utilizing a common telephone number.

BACKGROUND

Wireless communications devices allow users to engage in one-to-one communications such as real time conversations, and sending and receiving messages. Conventional wireless communications devices possess limited capabilities for communicating with groups of individuals. For example, a user cannot send a message to a group of individuals without inputting a telephone number for each individual's device in the group. This can be a time consuming process for a group having a large number of individuals. Thus, it would be advantageous if a wireless communications device could send text messages to a group of recipients without inputting a telephone number for each individual.

BRIEF DESCRIPTION OF THE DRAWINGS

FIG. 6 illustrates an example of a third logic flow.

DETAILED DESCRIPTION

Figure 1A:
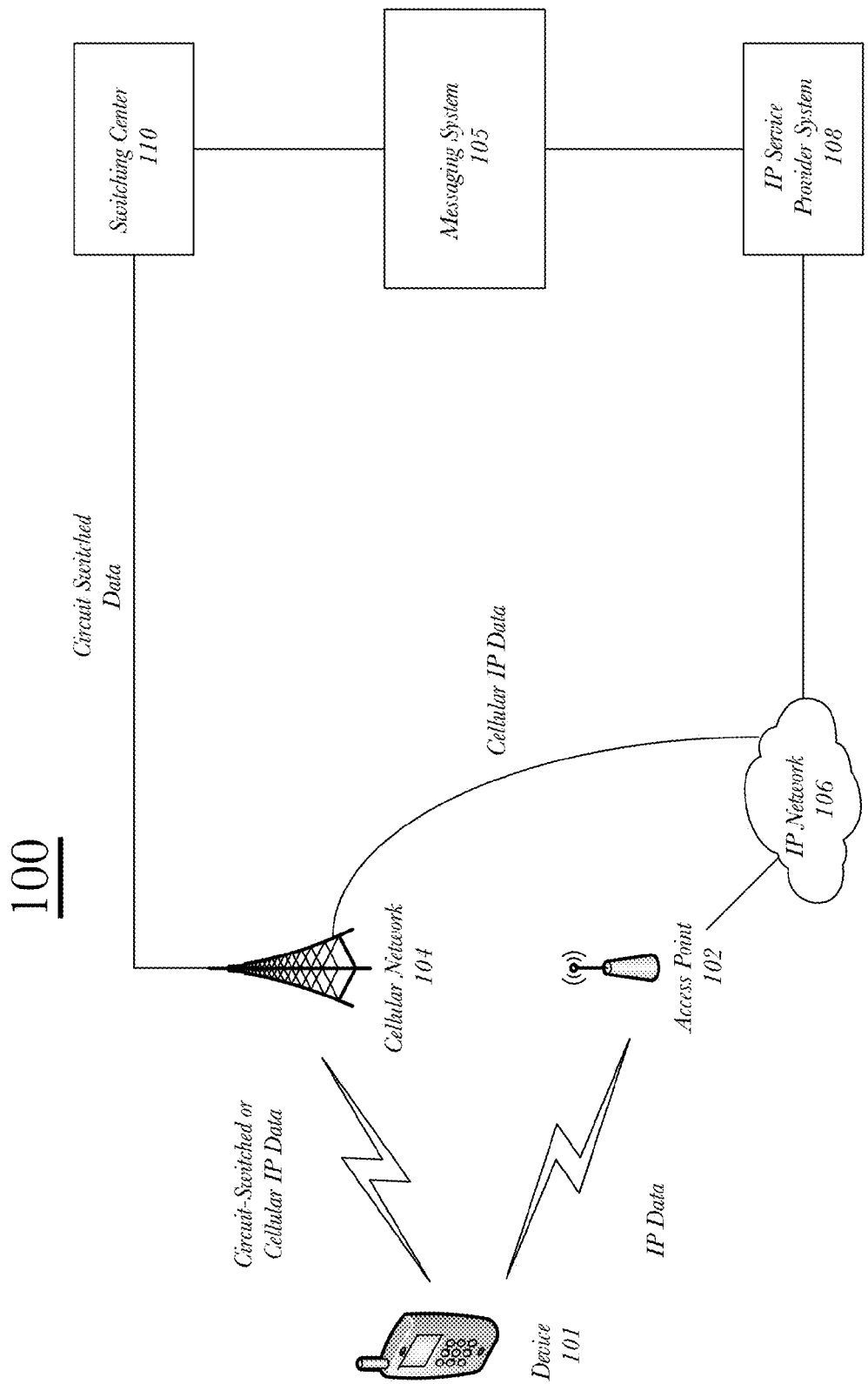
FIG. 1A illustrates an example embodiment of a system.

Various embodiments may include a system, apparatus, and techniques to communicate messages between users utilizing a common telephone number. For example, a common telephone number may be established on a permanent or temporary basis to permit users (devices) to communicate messages to one or more other users (devices) registered to receive a message. In some instances, the common telephone number may be assigned to a device having a message proxy service that is capable of receiving messages via the common telephone number. The message proxy services may forward or send the message to one or more recipient devices. The device may determine the recipients based on a number of factors, as will be discussed in more detail below.

In one specific example, a device may receive a message directed towards the common telephone number, the common telephone number may enable communications between attendee devices and organizer devices. The device may determine whether the message is received from an attendee device or an organizer device based on a telephone number associated with the message and a sending device. In some instances, the determination may be made based on lookup performed using an attendee device list and/or an organizer device list. For example, the phone number of the sending device may be determined and used to look up whether the sending device is listed in one of the attendee device list or the organizer device list.

In some embodiments, the device, in response to determining that the message is received from the attendee device, may send the message to one or more organizer devices. In some embodiments, the message may be sent to all of the organizer devices listed in the organizer device list, for example. In this example, an attendee or a user of an attendee device may communicate the message to all of the organizers of a conference, for example.

Further, the device, in response to determining that the message is received from the organizer device, may send the message to all attendee devices or a specific attendee device based on information in the message. For example, embodiments may enable organizers of a conference to send messages to one or all attendees of a conference by utilizing symbols, as will be discussed in more detail below. Embodiments are not limited in this manner. Some embodiments may enable an organizer to send a message to multiple, but not all of the attendees, by utilizing multiple attendee identifiers, for example. These and other details will become more apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an exemplary embodiment of a system 100 in which aspects of the present disclosure may be employed. The system 100 may include a number of devices, systems, and infrastructure to enable one or more devices, such as device 101, to communicate with one or more other devices. These communications include voice and text communications. Embodiments discussed herein are particularly directed towards processing and handling of messages, including text messages, short messaging service (SMS) messages, multimedia messaging service (MMS) messages, presence messages, chat messages, interapplication messages, social messages, instant messages (IMs), etc. communicated between devices using a common telephone number. A common telephone number may be any telephone number established on a permanent or temporary basis to permit users (devices) to communicate messages to one or more other users (devices) registered to receive the message. For example, the common telephone number may be assigned to a device having a message proxy service that is capable of receiving messages via the common telephone number. The device having the message proxy services may forward or send the message to one or more recipient devices. The device may determine the recipients based on a number of factors. In some instances, the device may modify the received message prior to sending it to the recipients. These and other details will become more apparent in the following description.

Further, the system 100 enables communication with a messaging system 105, via one or more of a cellular network 104 and an Internet Protocol (IP) network 106. The device 101 may be communicatively coupled with a cellular network 104, an IP network 106, or both and enabled to wirelessly communicate one or more messages to the messaging system 105, for example. Note that the messages may include SMS messages, IMs, or any other type of text-based message, as previously discussed. For example, embodiments may include communicating the message in a cellular message format, such as SMS or MMS, with the messaging system 105 as circuit-switched data. Similarly, embodiments may include communicating messages with the messaging system 105 via the cellular network 106 as cellular IP data which may be communicated from the cellular network 104 and the IP network 106, for example. In a third example, embodiments may include the device 101 communicating messages with the messaging system 105 via the IP network 106, which may be accessed by an access point 102, for example. In the cellular IP data and IP data examples, the message may be an IM in an IP message format or packet-based format. Embodiments are not limited in this manner. Note that the device 101 communicating messages with the messaging system 105 may include both sending and receive the messages via any of the previously discussed techniques. Further, although FIG. 1 only illustrates a single device 101, embodiments are not limited in this manner and as will apparent in the following description embodiments may include any number of devices to communicate messages.

In embodiments, the cellular network 104 may include infrastructure, such as one or more radio service towers, equipment, and devices to process a wireless communication communicated as radio signals. For example, a radio service tower may receive a wireless communication as one or more wireless radio signals from the device 101. The signals may include data destined from the messaging system 105 based on a common telephone number, for example. The radio signals and data may be processed by receiving circuitry, converters, modulators, and so forth. Further, cellular network 104 may also include devices such as switches, routers, and other circuitry to process the received wireless communications. In some embodiments, the cellular network 104 may be communicatively coupled with or include a switching center 110, such as a mobile switching center (MSC) or a short message service center (SMSC). The switching center 110 may receive and route communications to and from the device 101 and the messaging system 105. For example, the cellular network 104 may communicate messages communicated as circuit-switched data to and from the device 101 and the messaging system 105 via the switching center 110.

In some embodiments, the cellular network 104 can process and route cellular IP data, which may include messages, to the IP network 106. For example, the cellular network 104 including one or more of the switches, routers, and other circuitry that may be coupled with the IP network 106 and may forward cellular IP data to the IP network 104 via these switches, routers, circuitry and so forth. This cellular IP data may be processed by the IP network 106 and communicated between the device 101 and the messaging system 105, via the IP service provider system 108.

In some embodiments, the system 100 may enable the device 101 to communicate text communications via an IP network 106 and provide messaging services via the IP service provider system 108 and the messaging system 105. The IP network 106 includes any number of networking devices and interconnects to enable device 101 to communicate voice, text, and data communications. For example, the IP network 106 may include an access points, modems, routers, switches, gateways, servers, and so forth to provide an IP network, such as the Internet and/or any other local area or wide area network for sending and receiving calls and messages including but not limited to IMs. In some embodiments, the IP network 106 may include and/or be coupled with a Bluetooth® mesh network to communicate data and information between the device 101 and the messaging system 105. The devices of the IP network 106 may enable communication of information in IP packets, for example. Embodiments are not limited in this manner.

In embodiments, the system 100 may also include an IP service provider system 108, which may receive and route calls, texts, and other communications to and from the device 101 and the messaging system 105. For example, the device 101 may utilize a common telephone number to send a message which may be routed by the IP service provider system 108 to the messaging system 105. In some instances, the IP service provider system 108 may include information configured to perform these routing operations. The IP service provider system 108 may also include devices coupled with the messaging system 105 to provide messaging services for the device 101. In some embodiments, the IP network 106, IP service provider system 108, and messaging system 105 may be part of single network, such as a local area network (LAN). Embodiments are not so limited.

Figure 1B:
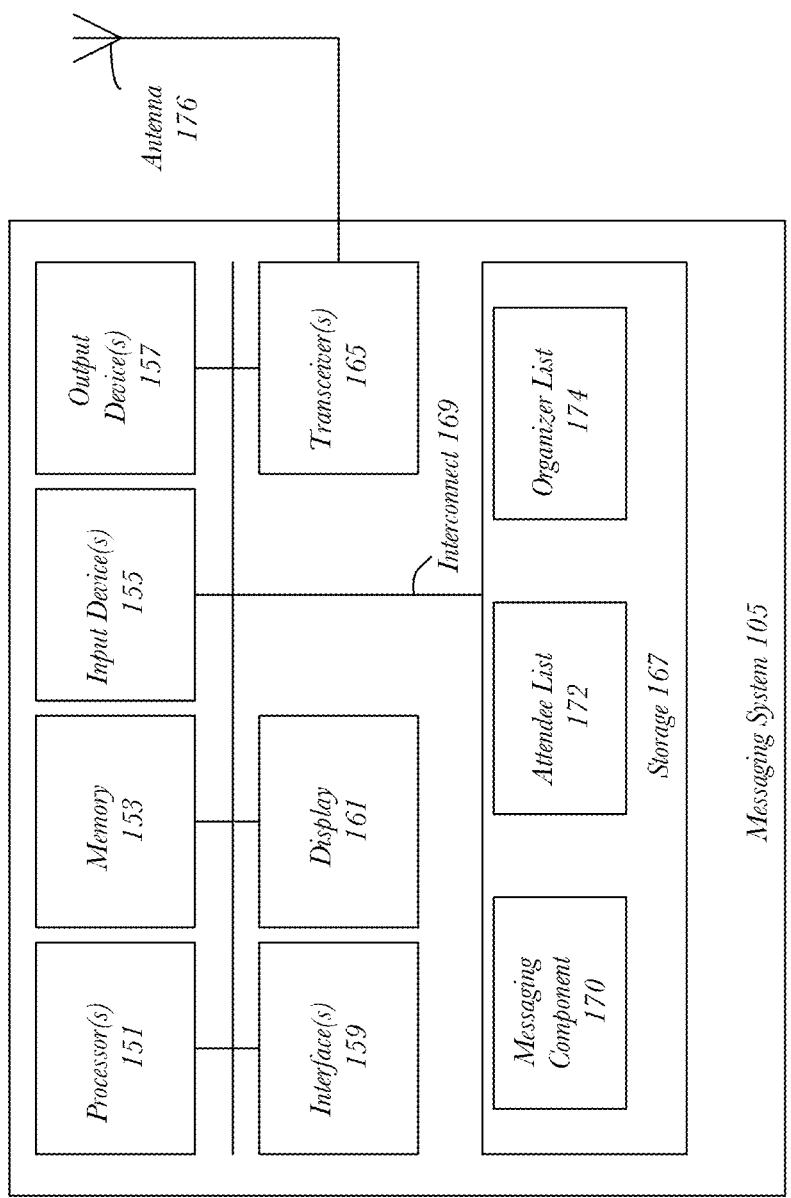
FIG. 1B illustrates a second example embodiment of a system.

FIG. 1B illustrates an example embodiment of the messaging system 105 having a number of components to process and communicate information including messages. The messaging system 105 may be capable of communicating information and data via both cellular networks 104 and IP networks 106 including the Internet.

The messaging system 105 may be embodied as a communication station, a mobile station, an advanced station, a client, a platform, a wireless communication device, a mobile computer, a laptop computer, a notebook computer, a tablet computer, a server computer, a handheld computer, a handheld device, a Personal Digital Assistant (PDA) device, a handheld PDA device, netbook, a mobile telephone, a smart phone, a mobile cellular telephone, and so forth. In some embodiments, the messaging system 105 may be embodied as a server device, server computer, a blade-server, or any other type of server. In some embodiments, the messaging system 105 may be embodied in more than one device or server. Embodiments are not limited in this manner.

The messaging system 105 may include one or more processors 151 which controls one or more operations of the messaging system 105. A processor 151 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. For example, a processor 151 may include a graphical processing unit (GPU) for processing graphical and video information, in various embodiments. In some embodiments, a processor 151 may be connected to and communicate with the other elements of the computing system via an interconnect 169, such as one or more buses, control lines, and data lines.

The messaging system 105 also includes memory 153 which may be one or more of random access memory (RAM), read-only memory (ROM), electrically erasable programmable read-only memory (EEPROM), flash memory, and hard disk memory. The memory 153 is not limited to these memory components. For example, the memory 153 may include one or more non-transitory computer-readable storage medium(s). These memory components can store data momentarily, temporarily, or permanently. The memory 153 can store instructions and data for messaging system 105. The memory 153 may also store temporary variables or other intermediate information while a processor 151 is executing instructions.

In some embodiments, the messaging system 105 may also include one or more input devices 155 and output devices 157. An input device 155 may include one or more buttons, a keyboard, a keypad, a touchscreen display, a touch sensitive device, a microphone, a camera or any other device used for inputting information and data into the messaging system 105. An output device 157 may be a speaker, a haptic feedback device, one or more light emitting diodes, a buzzer, a vibration device, and so forth. In some embodiments, the messaging system 105 may include one or more displays 161, such as a liquid crystal display (LCD). In embodiments, these and other devices may be coupled with the messaging system 105 via one or more interfaces 159 and communicate with a processor 151 and memory 153 via interconnect 169, for example. An interface 159 can be a parallel port, IEEE 1394 serial port, a game port, a universal serial bus (USB) port, an infra-red (IR) interface, and so forth. Interface 159 may also be a network interface capable of communicating IP data and cellular data including, but not limited to, messages. In some embodiments, the messaging system 105 may include multiple network interfaces, one of which is capable of communicating via the cellular network 104 and another of which is capable of communicating the IP network 106.

The messaging system 105 may include one or more transceivers 165 coupled with one or more antennas 176 for reception and transmission of information, messages, packets, frames and so forth between other devices. In some embodiments, a transceiver 165 may include a transmitter and a receiver to allow transmission and reception of information and data between the messaging system 105 and remote locations, such as one or more devices 101 via a cellular network 104 and/or an IP network 106. The transmitter and receiver may be combined into the transceiver 165. The antenna(s) 176 may be attached to the messaging system 105 and electrically and communicatively coupled to the transceiver 165. The messaging system 105 may also include (not shown) multiple transmitters, multiple receivers, multiple transceivers, and/or multiple antennas. For example, the messaging system 105 may include a first transceiver capable of communicating via the cellular network 104 and a second transceiver capable of communicating via the IP network 106. Embodiments are not limited in this manner.

In embodiments, the messaging system 105 may also include storage 167 capable of storing applications, information and data. By way of example, storage may be disk drives, optical storage devices, solid-state storage device such as a random access memory ("RAM") and/or a read-only memory ("ROM"), which may be programmable, flash-updateable and/or the like. In embodiments, the storage 167 may store applications and components, such as a messaging component 170, which may be executed by a processor 151 and utilize memory 153 for temporary storage of instructions and data. The storage 167 can store other information and data, such as an attendee device list 172 and an organizer device list 174. The attendee device list 172 may store information indicating devices registered as attendee devices for the messaging system 105 and the organizer device list 174 may store information indicating devices registered as organizer devices for the messaging system 105, as will be discussed in more detail below. Note, some embodiments, may include a single list, such as a registration list, having both devices registered as attendee devices and devices registered as organizer devices. The devices may be identified as such in the single list. Embodiments are not so limited.

In embodiments, the text messaging system 105 may include an operating system (not show), such as Android®, Apple iOS®, Symbian®, Blackberry OS®, Windows OS®, Palm OS®, and so forth. The operating system may provide and environment and enable other applications, such as the messaging component 170 to operate.

The messaging component 170 may include a framework and logic implemented in software, hardware, or both to operate as a message proxy and process messages for the text messaging system 105. The framework may include one or more application programming interfaces (APIs) in the form of libraries capable of interfacing with applications, an operating system, and other components of the text messaging system 105, for example. The messaging component 170 may perform various functions and operations including enabling communication of messages between devices, such as device 101.

In some embodiments, the messaging component 170 may provide message proxy services to communicate the messages between the devices utilizing a common telephone number. For example, a device 101 may send a message using a common telephone number which may be received by the messaging system 105, processed, and communicated to one or more other devices. In some instances, the message component 170 may determine the one or more other devices to forward or relay the message based on a registration of the sending device and one or more other devices and whether the message include a symbol or keyword. In some embodiments, the messaging component 170 may enable registration (and deregistration) of one or more devices for the messaging system 105. As will be discussed in more detail below, the use of a common telephone number by a plurality of users and devices may enable the communication of messages between devices, such as from a single device to another device or from a single device to any number of other devices in a broadcast. These and other details will become more apparent in the following description and logic flows.

Figure 2:
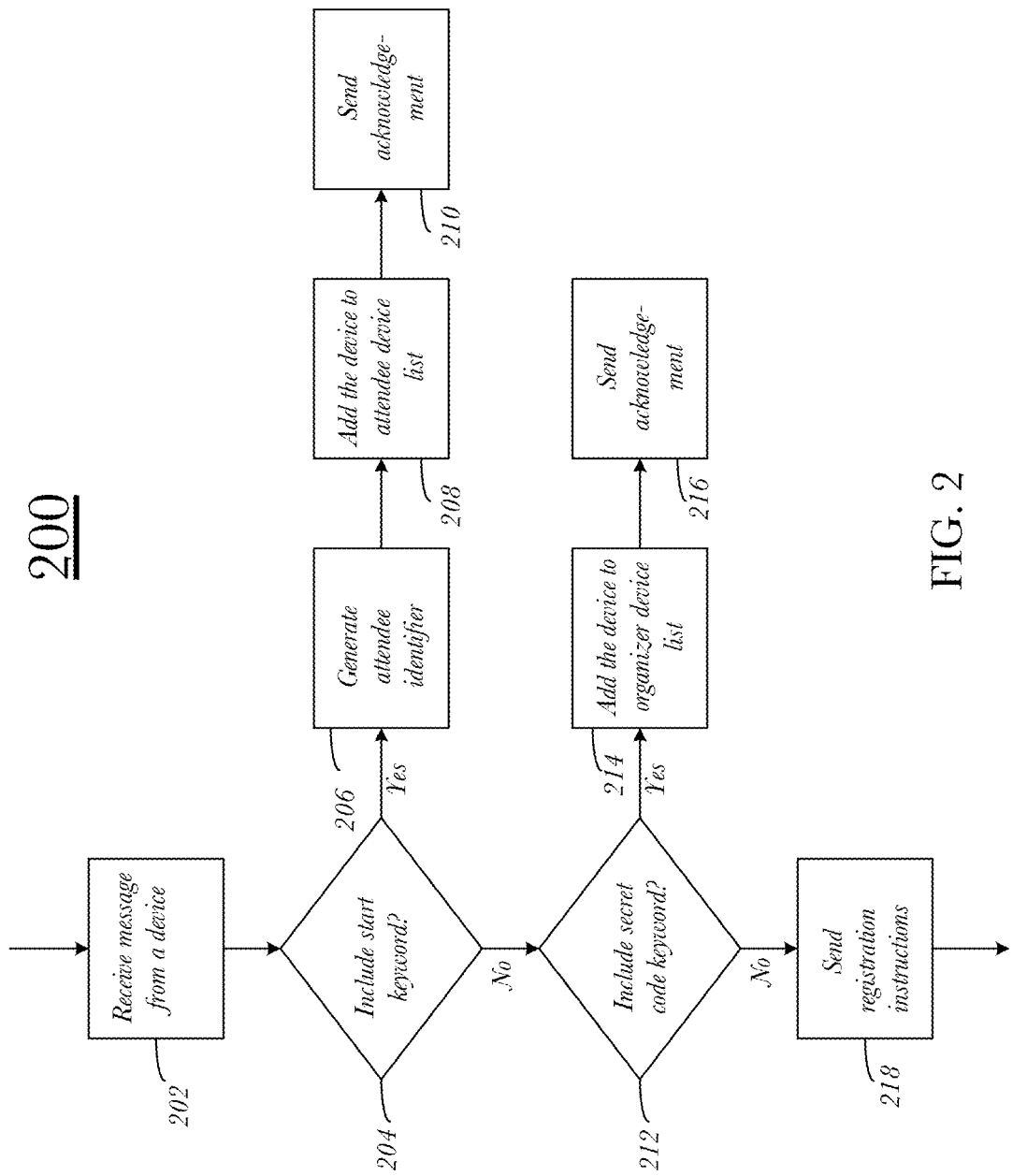
FIG. 2 illustrates an example of a first logic flow.

FIG. 2 illustrates one embodiment of a first logic flow 200. The logic flow 200 may be representative of some or all of the operation including a registration operation executed by one or more embodiments described herein. Further, the logic flow 200 may performed by circuitry and one or more components discussed herein, such as the messaging component 170. Moreover, logic flow 200 may be performed in conjunction with one or more other logic flows discussed herein and lists particular steps occurring in a particular order.

The logic flow 200 may be one example flow to perform a registration process to register a device as an attendee device or organizer device to communicate messages. In embodiments, a message may be received by one or more operations or processes of the messaging system 105 at block 202. Note that the message may be received in the form of circuit-switched data via the cellular network 104 or IP data via the IP network 106 or the cellular network 104. In one example, the cellular network 104 or IP network 106 may communicate the message based on the sending device utilizing a common telephone number associated with the messaging system 105. In other words, the messaging system 105 may be associated or assigned a single or common telephone number that may be used by a plurality of users to communicate messages between devices registered in the messaging system 105. Note that the common telephone number does not necessarily need to be a number, but may be one or more symbols or identifier that may be associated with the messaging system 105. Embodiments are not limited in this manner.

In another embodiment, a user may scan an image such as a QR code. Upon recognition of the QR code, the user's device may receive a prompt to register her device. The prompt may ask the user to input her telephone number to become registered as an attendee device. The prompt may be associated with an application executing on the user's device that is communicable with the messaging system 105.

In some embodiments, the message may include any combination of alphanumeric characters and symbols. These alphanumeric characters and symbols may form the body or content of the message. Further, the alphanumeric characters may form one or more keywords that may be used by the messaging system 105 to process the message. Similarly, one or more symbols may be part of the message and also used by the messaging system 105 to process the message.

In some instances, the messaging system 105 may be able to determine a telephone number associated with the sending device of message. For example, the message may include the sender device's telephone in a header of the message. In another example, the messaging system 105 may determine the sender device's telephone number based on information in one or more other messages communicated to the messaging system 105 associated with the message. As will be discussed in more detail, the keywords, symbols, and the sender device's telephone number may be used by the messaging system 105 to perform various operations and processing.

For example, the messaging system 105 may determine whether the message includes a start keyword at block 204. In some instances, the messaging system 105 may compare data in the message with data stored in storage 167, for example, to determine whether the message includes the start keyword. The storage 167 may store a number of keywords and symbols which may be used by the messaging system 105 to cause various actions to occur. For example, the start keyword may be any combination of alphanumeric characters and symbols that may cause the messaging system 105 to register a device as an attendee device. The start keyword may be characters forming the word "start," for instance. However, embodiments are not limited and the start keyword may be any combination of alphanumeric characters or symbols and may be defined by a user or administrator of the messaging system 105, for example. The start keyword may be passed out to users and devices 101, such that the start keyword may be used by the users to register devices 101.

If the messaging system 105 determines the message includes a start keyword, the device may be identified an attendee device and an attendee identifier may be generated and assigned at block 206. The attendee identifier may be any combination of alphanumeric characters or symbols that may be assigned to the sending device to uniquely identify the device. For example, the attendee identifier may be "user_1" for the first device registered as an attendee device. Embodiments are not limited in this manner.

Further, the attendee identifier may be associated with the sender device and added to the attendee device list at block 208. For example, a line item may be generated in the attendee device list 172 including the sending device's telephone number, the attendee identifier, and in some instances, an indication that the device is registered as an attendee device. At block 210, the messaging system 105 may cause a return or acknowledgment message to be communicated back to the sending device of the message received at block 202. The acknowledgement message may be communicated back to the sending device via the cellular network 104 or the IP network 106 based on the sending device's telephone number, for example. In addition, the acknowledgement message may include information indicating whether the registration was successful or not successful, and the attendee identifier. In some instances, the organizer devices may also be sent the acknowledgement message indicating that a user has registered an attendee device. Embodiments are not limited in this manner.

If the messaging system 105 determines the message does not include a start keyword, the messaging component 170 may determine whether the message includes a secret code keyword at decision block 212. In some instances, messaging system 105 may compare data in the message with data stored in storage 167, for example, to determine whether the message includes the secret code keyword. Further, the secret keyword may be any combination of alphanumeric characters and symbols that may cause the messaging system 105 to register a device as an organizer device. In some instances, the secret code keyword may be known by a user of a device prior to sending the message. For example, the user may be an organizer of a conference or administrator of the system and may have preexisting knowledge of the secret code keyword used by the messaging system 105 to registration a device as an organizer device. Embodiments are not limited in this manner. For example, the secret code keyword may be distributed to one or more devices utilizing encryption techniques.

If the messaging system 105 determines the message includes the secret code keyword, the messaging system 105 may register the sending device as an organizer device at block 214. For example, the sending device's telephone number may be added to the organizer device list 174 at block 214. In addition, an indication that the device is registered as an organizer device may be added to the organizer device list at block 214. Embodiments are not limited in this manner and other information may be included in the organizer device list 174.

At block 216, the messaging system 105 may cause a return or acknowledgment message to be communicated back to the sending device of the message received at block 202. The acknowledgement message may be communicated back to the sending device via the cellular network 104 or the IP network 106 based on the sending device's telephone number, for example. In addition, the acknowledgement message may include information indicating whether the registration was successful or not successful. Embodiments are not limited and the acknowledgement may include other information and data and may also be sent to other organizer devices.

In some embodiments, the logic flow 200 may include sending registration instructions to the sending device of the message at block 218. For example, if the message received at block 202 does not include a keyword (start or secret code) and was not sent by a registered device, the messaging system 105 may return registration instructions in a message, which may include the start keyword, to enable a device to register. In some embodiments, the messaging system 105 may determine whether the device is already registered with the messaging system 105 prior to sending the registration instructions at block 218. For example, the messaging system 105 may determine whether the sending device is registered or not registered prior to performing the logic flow 200. If the sending device is registered, the messaging system 105 may process the message as discussed below in logic flow 300.

Figure 3A:
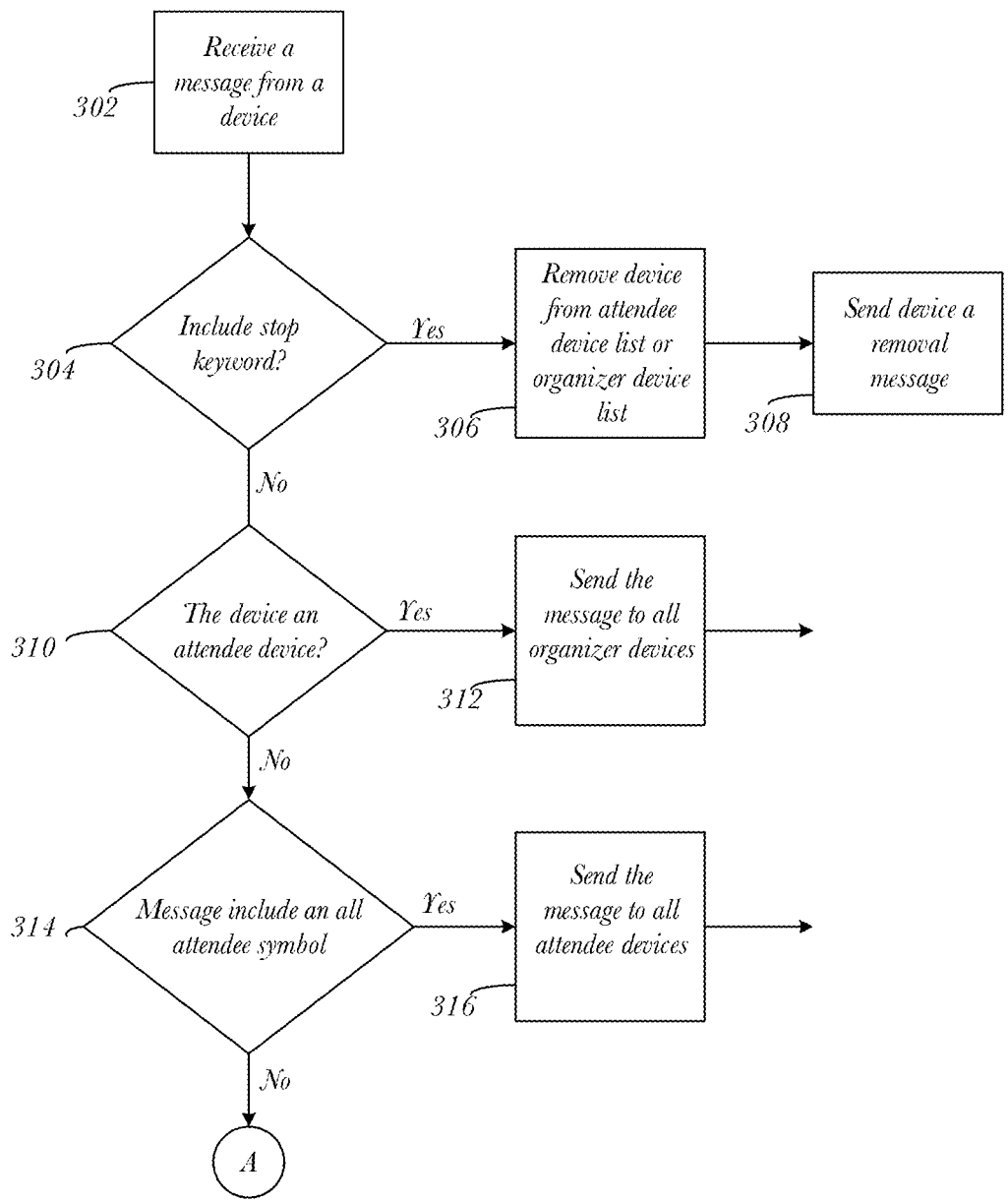
FIG. 3A illustrates an example of a second logic flow.
Figure 3B:
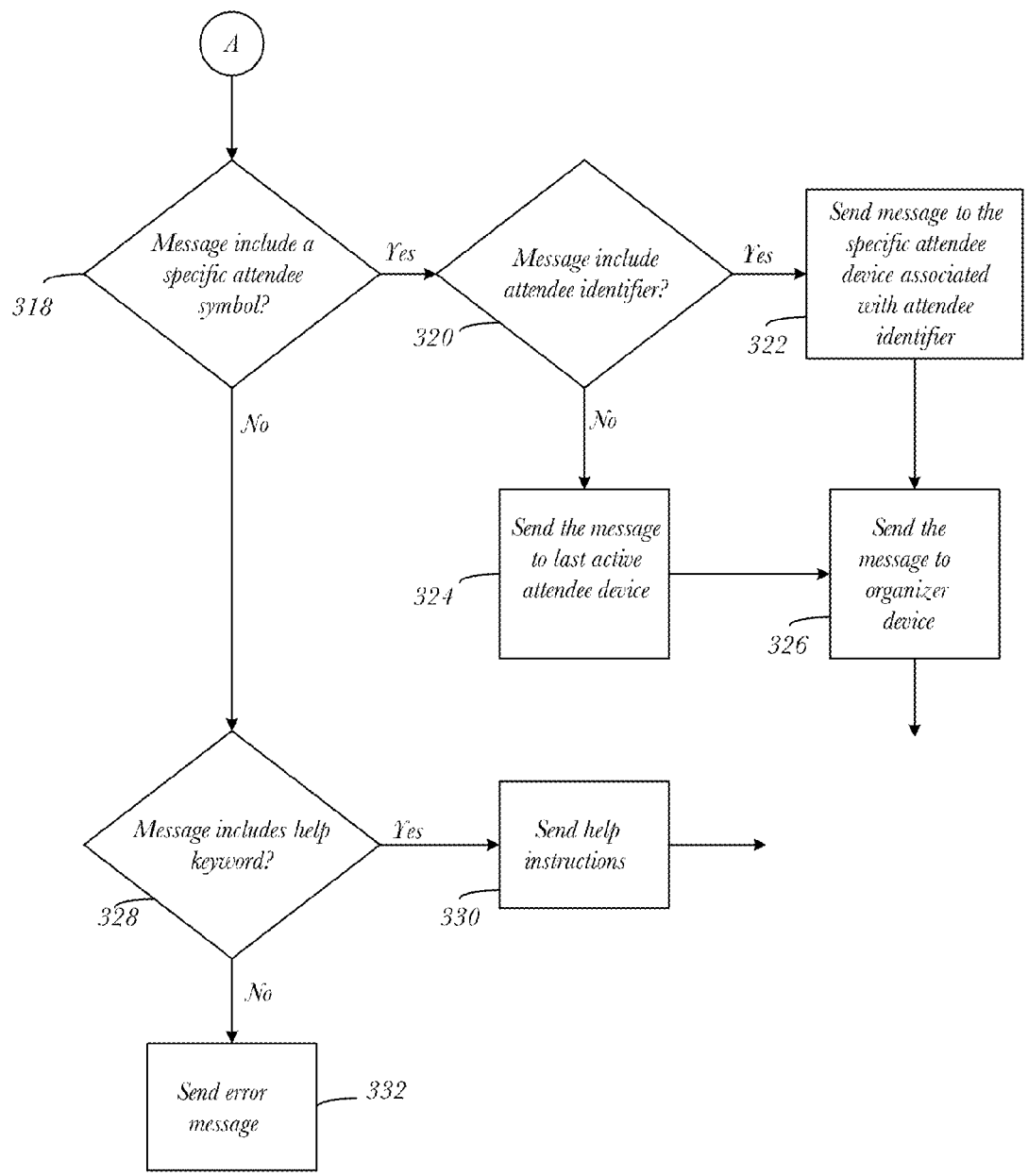
FIG. 3B illustrates a continuation of the example of the second logic flow.

FIGS. 3A and 3B illustrate example embodiment of a second logic flow 300. The logic flow 300 may be representative of some or all of the operations executed by one or more embodiments described herein. Further, the logic flow 300 may be performed by circuitry and one or more components discussed herein, such as the messaging component 170. Moreover, logic flow 300 may be performed in conjunction with one or more other logic flows discussed herein.

The logic flow 300 may be one example processing flow for performing message proxy services including relaying a received message to one or more other devices. At block 302, the messaging system 105 may receive a message from a sending device. In some embodiments, the message may be sent to the messaging system 105 via a cellular network 104 or an IP network 106 based on the utilization of a common telephone number associated with the messaging system 105.

At block 304, the messaging system 105 may determine whether the message includes a stop keyword. In some instances, the messaging system 105 may compare data in the message with data stored in storage 167 to determine whether the message includes the stop keyword. For example, the stop keyword may be any combination of alphanumeric characters and symbols that may cause the messaging system 105 to deregister a device as an attendee device or organizer device. The stop keyword may be characters forming the word "stop," for instance. However, embodiments are not limited and the stop keyword may be any combination of alphanumeric characters or symbols and may be defined by a user or administrator of the messaging system 105. In some instances, the stop keyword, may be passed to a device during the registration process and/or via help instructions.

If the message includes the stop keyword, the messaging system 105 may deregister the sending device from the messaging system 105. For example, the messaging system 105 may remove the sending device from a list, such as the attendee device list 172 or organizer device list 174, at block 306. The messaging system 105 may determine which list the sending device is on by performing a lookup based on a telephone number associated with the sending device. Further and at block 308, the messaging system 105 may communicate an acknowledgement message to the device indicating whether it has been successfully or unsuccessfully removed from the messaging system 105.

At decision block 310, the messaging system 105 may determine whether the device that sent the message is an attendee device or not. For example, the messaging system 105 may perform a lookup to determine whether a telephone number associated with the sending device is listed in the attendee device list 172 or not, for example. Embodiments are not limited in this manner and other techniques may be used to make the determination.

The messaging system 105 may communicate or cause the message to be communicated to all organizer devices at block 312, e.g. devices registered as organizer devices, if the message was sent from an attendee device. More specifically, the messaging system 105 may determine which devices are organizer devices by performing a lookup in the organizer device list 174 and the send the message. Note that sending the message at block 312 may include generate new message to send or sending a copy of the message. In some embodiments, the messaging system 105 may include the content in next messages to send to teach of the organizer devices, for example. The new or copied messages may be an exact duplicate or modified to include more or less information, as will be discussed in more detail below.

Moreover, the message may be communicated to each of the organizer devices via a cellular network 104 or IP network 106, as discussed in FIG. 1A. In one example, the messaging system 105 may determine telephone numbers for the organizer devices, and send the message via the cellular network 104 or IP network 106 to each of the organizer devices via the determined telephone numbers. Note that embodiments are not limited in this manner and other identifiers may be used, such as IP addresses, media access control (MAC) addresses, etc. to determine and/or send the message. Thus, when the messaging system 105 receives a message from a device registered as attendee device, the message (or a copy) may be relayed to each of one or more organizer devices. Thus, an organizer of a conference, symposium, gathering, etc. may be able to receive each message sent by an attendee.

At decision block 314, the messaging system 105 may determine whether the message includes an all attendee symbol. The all attendee symbol may be an alphanumeric character or any other symbol and may be known to a user of the messaging system 105. For example, symbols for use with the messaging system 105 may be communicated with the registration instructions or via help instructions. In some instances, the all attendee symbol may be a single symbol, such as '#', or multiple symbols, such as 'atd'. Embodiments are not limited in this manner.

At block 316, the messaging system 105 may communicate the message to all attendee devices. For example, the messaging system 105 may determine telephone numbers for the attendee devices, and send the message via the cellular network 104 or IP network 106 to each of the attendee devices via the determined telephone numbers. As discussed above, other identifiers may be used to send the attendee devices the message. Thus, in this example logic flow 300, a message communicated by an organizer device may be forwarded or relayed to all attendee devices based on the use of the all attendee symbol. As similarly discussed, sending the message to each of the attendee devices may include sending a copy or a new message based on the received message to each of the attendee devices. In some embodiments, more or less information may be in the new or copied message, as will be discussed in more detail.

In some embodiments, the messaging system 105 may determine whether the message includes a specific attendee symbol at block 318. The specific attendee symbol may be an alphanumeric character or any other symbol and may be known to a user of the messaging system 105. In some instances, the specific attendee symbol may be a single symbol, such as '@', or multiple symbols, such as 'AT'. Embodiments are not limited in this manner.

At block 320, the messaging system 105 may determine whether the message includes an attendee identifier. For example, the message may include the specific attendee symbol followed by the attendee identifier assigned to an attendee device during registration. For example, the message may include "@user_1" indicating the message may be directed to a specific attendee device associated with attendee user_1.

If the message includes an attendee identifier at block 320, the messaging system 105 may send the message to the specific attendee device identified by the attendee identifier at block 322. In one example, the messaging system 105 may perform a lookup using the attendee identifier in the message to determine a phone number associated with the specific attendee device. For example, the attendee device list 172 may include a listing of attendee device's telephone numbers and associated attendee identifiers for use in performing the lookup. The messaging system 105 may send the message to the specific attendee device via a cellular network 104 or an IP network 106. Note that the message sent to the attendee device may be a copy or new message and may have more less information. For example, the message sent to the specific attendee device may not have the specific attendee symbol and/or the attendee identifier, but has the remaining content.

Further and at block 326, the messaging system 105 may communicate the message to all of the organizer devices. As similarly discussed above, the messaging system 105 may utilize the organizer device list 174 to determine organizer devices and communicate the message to the organizer devices via a cellular network 104 or an IP network 106. Each of the messages sent to the organizer devices may be a copy or new message and may have more or less information. For example, the message sent to the specific attendee device may indicate that the message is a response to a message sent by an attendee device.

With reference back to block 320, if the messaging system 105 determines the message does not include an attendee identifier, the messaging system 105 may communicate the message to the last attendee device to communicate a message at block 324. In some instances, the messaging system 105 may keep a log of all messages it receives and sends. The log may be stored in storage 167 or memory 153 and includes identification information, such as a telephone number, an attendee identifier, and so forth to identify a sender of a message. The log may also store information such as a device type identifier (attendee device or organizer device), and a timestamp of when a message was received by or sent. In this example, the messaging system 105 may use the log to determine which device was the last attendee device to send a message that was received by the messaging system 105 and send the attendee device the message at block 324. Note that one or more messages may have been communicated in between the current message and the last message sent by an attendee device. For example, one or more messages may have been communicated by organizer devices. Embodiments are not limited in this manner.

Further and with reference back to decision block 318, if the message does not include a specific attendee symbol, the messaging system 105 may determine whether the message includes a help keyword. In some instances, the messaging system 105 may compare data in the message with data stored in storage 167 to determine whether the message includes the help keyword. The help keyword may be any combination of alphanumeric characters and symbols that may cause the messaging system 105 to send help information to the device sending the message. For example, the help keyword may be characters forming the word "help," which may be parsed from the message for use in the comparison. However, embodiments are not limited and the help keyword may be any combination of alphanumeric characters or symbols and may be defined by a user or administrator of the messaging system 105. In some instances, the help keyword, may be passed to a device during the registration process or via help instructions. For example, the help keyword may be provided to a sending device at block 332 as part of an error message if the help keyword is not in message. However, if the help keyword is in the message, the messaging system 105 may communicate help instructions at block 330 to the device sending the message. The help instructions may include instructions, keywords and symbols that may be used by an attendee of the messaging system 105.

Figure 4:
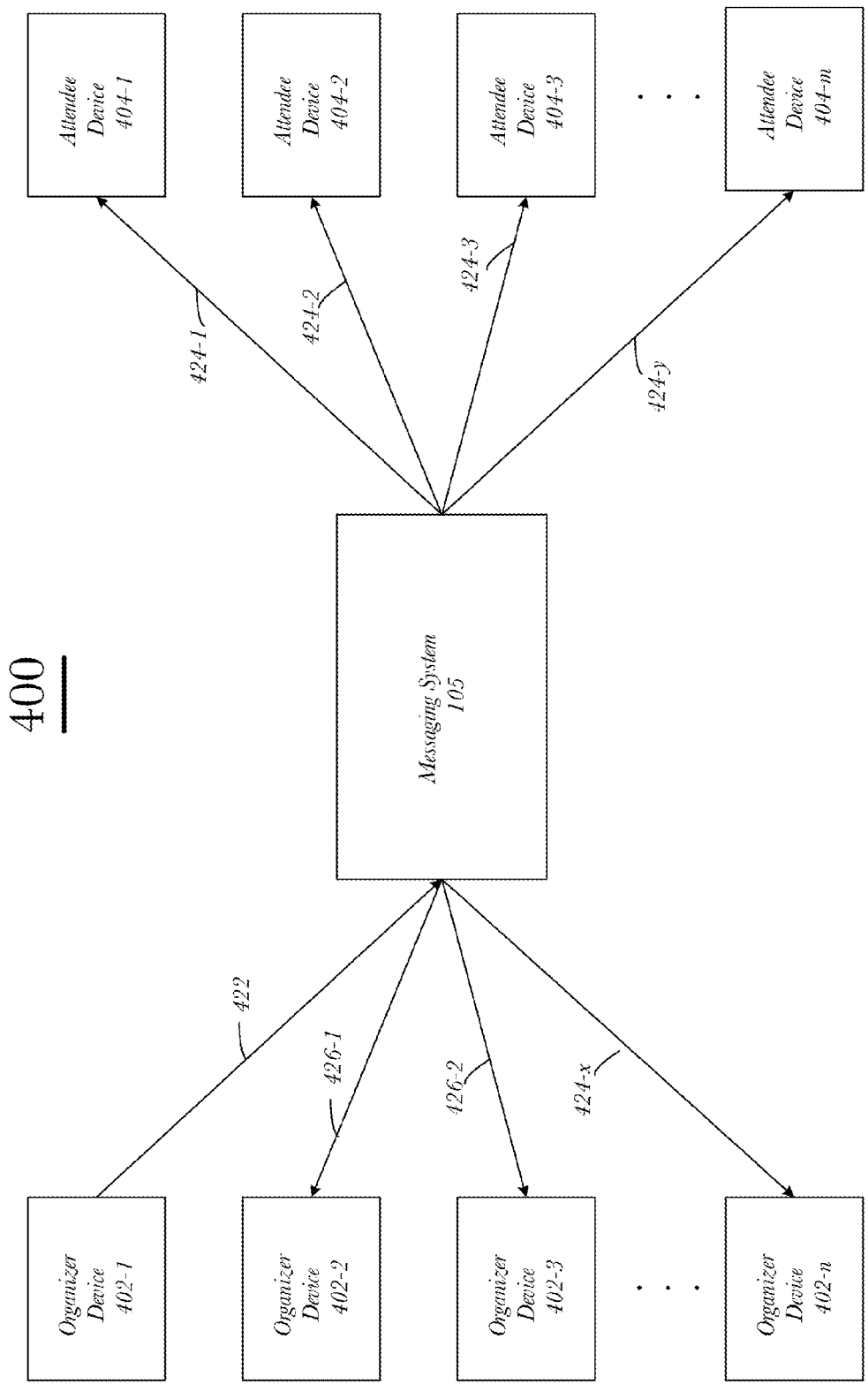
FIG. 4 illustrates an example of a first communication flow.

FIG. 4 illustrates an example of a first communication flow 400 for communicating a message from an organizer device 402 to all of the attendee devices 404 and the remaining organizer devices 402 via the messaging system 105. For example, the messaging system 105 may receive a message from an organizer device 402-1 at line 422 sent via a common telephone number. The messaging system 105 may process the message including determining whether the message includes an all attendee symbol or a specific attendee symbol. A message including a specific attendee device symbol may have the format <specific attendee symbol><content>, e.g. "@this is an example message including the specific attendee symbol." In some instances, the message including the specific attendee symbol may have the format <specific attendee symbol><attendee identifier:><content>, e.g. "@user_1: this is an example message including the specific attendee symbol and attendee identifier." Similarly, a message including the all attendee symbol may have the format <all attendee symbol><content>, e.g. "#this is an example message including the all attendee symbol." Note that if the message does not include either symbol, a default action may be performed, such as treating the message as including the all attendee symbol or sending (forwarding) the message only to devices registered as organizer devices. In other instances, the messaging system 105 may return an error message, indicating that the message must include an all attendee symbol or specific attendee symbol. Embodiments are not limited in this manner and other operations may be performed.

In this example embodiment, the message received at line 422 may include the all attendee symbol followed by content which may be sent or forwarded by the messaging system 105 to the attendee devices. Note that in sending the message to all of the attendee devices, the messaging system 105 may create one or more copies or new messages based on the received message to send to the attendee devices. In some instances, the messaging system 105 may remove the all attendee symbol from the message prior to it be sent to the attendee devices. Further and as previously discussed, the messaging system 105 may determine all attendee devices by utilizing a list, such as the attendee device list 172. In some embodiments, the information may be stored in other structures, such as in a table, data store, linked list, or any other data structure. Embodiments are not limited in this manner.

The message or copies based on the message may be sent to all of the attendee devices 404-1 through 404-m, at lines 424-1 through 424-y, where y may be any positive. Note that the messaging system 105 may communicate the messages to the attendee devices 404-1 through 404-m via one or more of a cellular network 104 and/or an IP network 106 which may be based on telephone numbers or other identifiers associated with the attendee devices 404-1 through 404-m determined in the lookup. In some instances, the messaging system 105 may remove the all attendee symbol from the message prior to sending it to the attendees. Thus, the message sent to the attendees at lines 424-1 through 424-y may have the format <content>, e.g. "this is an example message sent to attendee devices." Embodiments are not limited in this manner.

The messaging system 105 may also communicate the message or copies of the message to each of the organizer devices at lines 426-1 through 426-x, where x may be any positive integer. For example, one or more messages may be generated with the content of the received message and sent to the organizer devices via the cellular network 104 and/or the IP network 106. In some embodiments, the messaging system 105 may include a broadcast identifier with each of the messages sent to the organizer devices 402-1 through 402-n. the broadcast identifier may be a keyword, such as 'broadcast," or a symbol, such as'&'. The broadcast identifier may act as indicator to users of the organizer devices that the message was sent to the all of the attendee devices as a broadcast. In some embodiments, the message may have a format of <broadcast identifier:><content>, e.g. "Broadcast: this is an example message sent to organizer devices having a broadcast identifier." Embodiments are not limited in this manner.

Figure 5A:
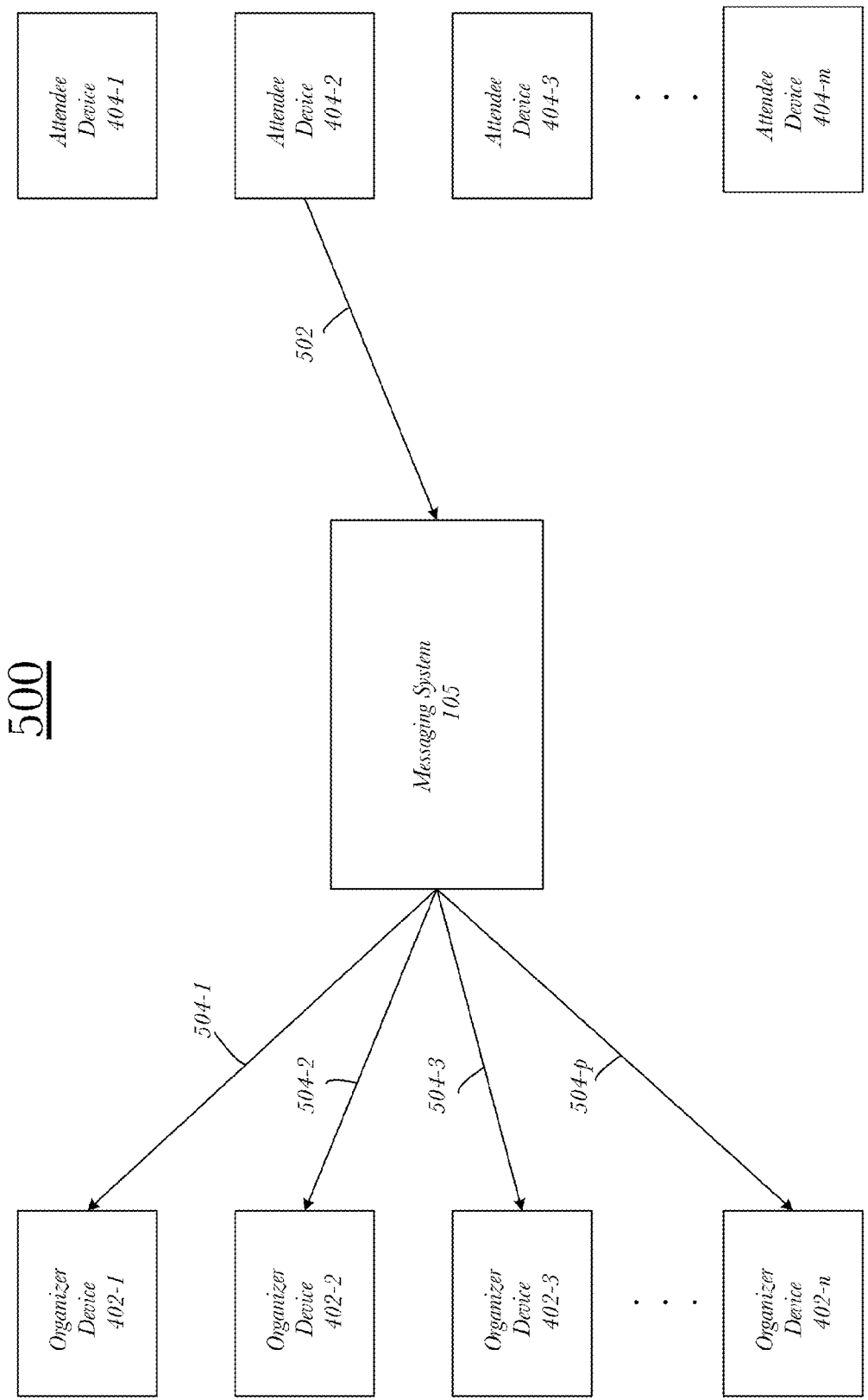
FIG. 5A illustrate an example of a second communication flow.
Figure 5B:
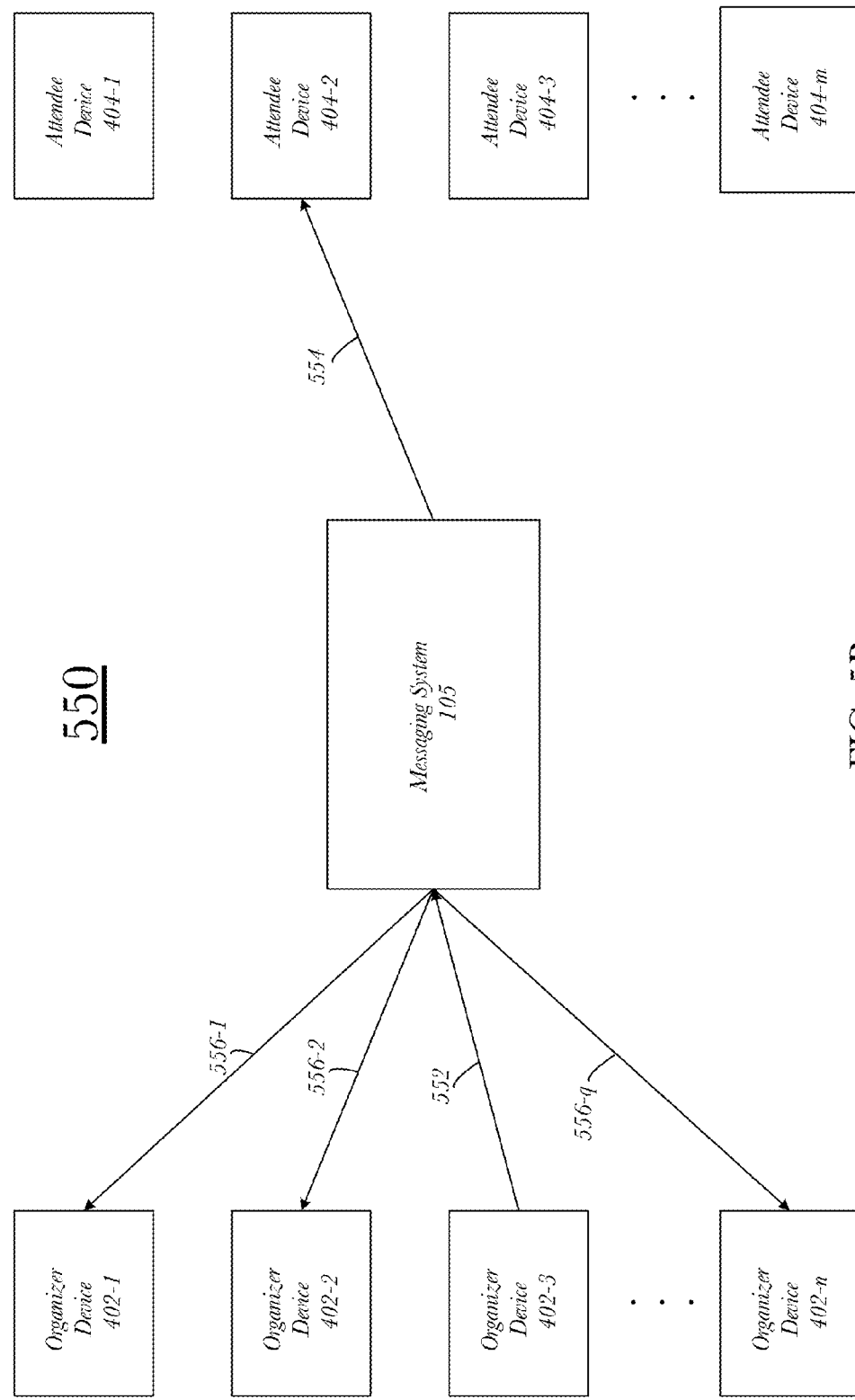
FIG. 5B illustrate an example of a third communication flow.

FIGS. 5A and 5B illustrate example second communication flow 500 for communicating a message sent by an attendee device to organizer devices and a third communication flow 550 for providing a response message to the message sent by the attendee device.

At line 502 in FIG. 5A, the attendee device 404-2 communicates a message to the messaging system 105 via a common telephone number. The messaging system 105 may receive and process the message, e.g. perform proxy services. In this example, the message may include content, but no symbols or keywords to provide a specific response to the attendee device 404-2. Thus, the messaging system 105 may determine to send the message to each of the organizer devices 402-1 through 402-n in a broadcast. The messaging system 105 may determine each of the organizer devices based on devices listed in the organizer device list 174 and send them the message at lines 504-1 through 504-p, where p may be any positive integer, via an associated telephone number for example. Said differently, the messaging system 105 may send the message to each of the organizer devices 402-1 through 402-n via their respective telephone numbers. In some instances, the messages may be communicated via cellular network 104 and/or an IP network 106.

In some instances, the messaging system 105 may communicate a copy or a new message including the content of the original message to each of organizer devices. The messages sent to each of the organizer devices 402-1 through 402-n may also include an attendee identifier identifying the attendee from whom the original message was sent. For example, the messaging system 105 may perform a lookup in the attendee device list 172 based on the sending device's telephone number (at line 502) to determine an attendee identifier for the attendee. The attendee identifier may be added to the message prior to the content or body of the text. For example, the messages sent to each of the organizer device 402-1 through 402-n may have a format of <attendee identifier:><content>, e.g. "user_1: example message including an attendee identifier." However, embodiments are not limited in this manner and the message may be sent using a different format. The attendee identifier may enable a user of an organizer device to determine the attendee who sent the message.

FIG. 5B illustrates organizer device 402-3 sending a response back to the attendee who sent the original message in FIG. 5A at line 502. More specifically, the organizer device 402-3 sends a message to the messaging system 105 utilizing the common telephone number at line 552. The message may include the specific attendee symbol and may be in the format <specific attendee symbol><content>, e.g. "@this is an example message including a specific attendee symbol." In some instances, the message may include a specific attendee symbol and an attendee identifier and may have the format <specific attendee symbol><attendee identifier:><content>, e.g. "@user_1: this is an example message including the specific attendee symbol and the attendee identifier." Embodiments are not limited to these examples.

The messaging system 105 may receive the message at line 552 and process the message, e.g. perform proxy services. In this example, the messaging system 105 may determine which specific attendee device to send the message based on whether the message includes or does not include the attendee identifier. When the attendee identifier is used, the messaging system 105 may perform a lookup to determine a telephone number associated with the attendee identifier to send the message. When the attendee identifier is not used, the messaging system 105 may send the message to a last attendee device that communicated a message. As previously discussed, this determination may be made based on a lookup in a log file, for example. The message sent at line 554 may have the format <content>, e.g. "this is a response example message." Embodiments are not so limited.

The messaging system 105 may also send the message received at line 552 to all of the organizer devices at lines 556-1 through 556-q, where q may be any positive integer. Further, the messaging system 105 may or may not send the message to the originating organizer device 402-3. In some embodiments, the messaging system 105 may send the message or a copy of the message to each of the organizer devices 402-1 through 402-n including a response identifier. The response identifier may identify both the organizer device sending the response and the attendee device receiving the response. For example, the response identifier may have the format <organizer device→attendee device>, e.g. "Organizer device 402-3→Attendee device 404-2." Thus, the message sent to the organizer devices 402-1 through 402-n may have the format <response identifier:><content>, e.g. "Organizer device 402-3→Attendee device 404-2: this is an example response message sent to all organizer devices including a response identifier." Embodiments are not limited to these examples.

FIG. 6 illustrates an example embodiment of a third logic flow 600. The logic flow 600 may be representative of some or all of the operations executed by one or more embodiments described herein. For example, the logic flow 600 may illustrate operations performed by systems 100 and 105. In the illustrated embodiment shown in FIG. 6, the logic flow 600 may include receiving a message directed towards a common telephone number, the common telephone number to enable communications between attendee devices and organizer devices at block 605. The common telephone number may be any telephone number established on a permanent or temporary basis to permit users (devices) to communicate messages to one or more other users (devices) registered to receive the message, such as a message. For example, the common telephone number may be assigned to a device having a message proxy service that is capable of receiving messages via the common telephone number. The device having the message proxy services may also forward or send the message to one or more recipient devices. The device may determine the recipients based on a number of factors. In some instances, the device may modify the received message prior to sending it to the recipients. Embodiments are not limited in this manner.

At block 610, the logic flow 600 may include determining whether the message is received from an attendee device or an organizer device based on a telephone number associated with the message and a device. In some instances, the determination may be made based on lookup performed using an attendee device list and/or an organizer device list. For example, the phone number of the sending device may be determined and used to look up whether the sending device is listed one of the attendee device list or the organizer device list.

The logic flow 600 may include, in response to determining that the message is received from the attendee device, sending the message to one or more organizer devices at block 615. In some embodiments, the message may be sent to all of the organizer devices listed in the organizer device list, for example. In this example, an attendee or a user of an attendee device may communicate the message to all of the organizers of a conference, for example.

In some embodiments, the logic 600 may include, in response to determining that the message is received from the organizer device, sending the message to all attendee devices or a specific attendee device based on information in the message at block 620. For example, embodiments may enable organizers of a conference to send messages to one or all attendees of a conference by utilizing symbols as previously discussed. Embodiments are not limited in this manner. Some embodiments may enable an organizer to send a message to multiple, but not all of the attendees, by utilizing multiple attendee identifiers, for example.

Figure 7:
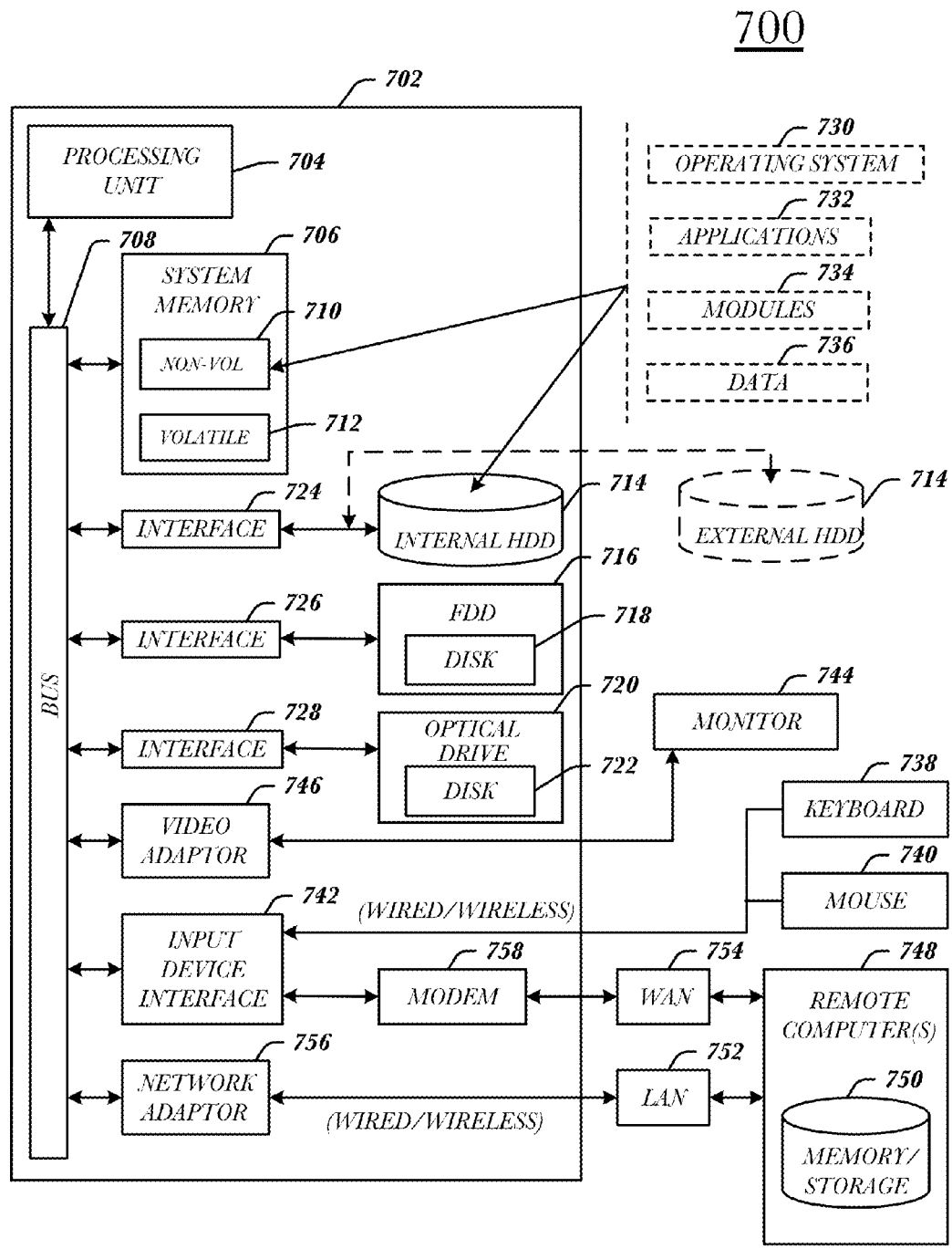
FIG. 7 illustrates an exemplary embodiment of a first computing architecture.

FIG. 7 illustrates an embodiment of an exemplary computing architecture 700 suitable for implementing various embodiments as previously described. In one embodiment, the computing architecture 700 may comprise or be implemented as part of device 101 and/or system 105, for example.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor 151 shown in FIG. 1B.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the touch gesture recognition system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
memory;
logic, at least a portion of which is implemented in circuitry coupled to the memory, the logic to:
receive a message addressed to a common telephone number associated with the apparatus, the common telephone number to enable communications between attendee devices and organizer devices;
determine whether the message is received from an attendee device or an organizer device based on a telephone number in a header of the message that identifies whether an attendee device or an organizer device sent the message;
in response to determining that the message is received from an attendee device, send the message to one or more organizer devices; and
in response to determining that the message is received from an organizer device, send the message to all attendee devices or a specific attendee device based on information in the message wherein the information comprises a first symbol indicating the message is to be sent to all attendee devices or a second symbol indicating the message is to be sent to a specific attendee device.

2. The apparatus of claim 1, the logic to:
determine the message includes the second symbol and an attendee identifier; and
send the message to the specific attendee device associated with the attendee identifier and the one or more organizer devices.

3. The apparatus of claim 1, the logic to:
determine the message includes the second symbol followed by text information;
determine the specific attendee device based on a last received message; and
send the message to the specific attendee device and the one or more organizer devices.

4. The apparatus of claim 1, the logic to:
determine the message includes the first symbol,
send the message to all attendee devices, and
send the message including a broadcast identifier to one or more organizer devices.

5. The apparatus of claim 1, the logic to:
determine the message includes a help keyword; and
send help instructions to a device associated with the telephone number.

6. The apparatus of claim 1, the logic to:
determine the message includes a stop keyword; and
remove a device associated with the telephone number from an attendee device list or an organizer device list.

7. The apparatus of claim 1, the logic to:
receive a different message comprising a start keyword;
generate an attendee identifier for a sending device for the different message; and
add the sending device and the attendee identifier to an attendee device list as an attendee device.

8. The apparatus of claim 1, the logic to:
receive a different message comprising a secret code keyword from a sending device; and
add the sending device to an organizer device list as an organizer device.

9. A computer-implemented method, comprising:
receiving a message addressed to a common telephone number associated with the apparatus, the common telephone number to enable communications between attendee devices and organizer devices;
determining whether the message is received from an attendee device or an organizer device based on a telephone number in a header of the message that identifies whether an attendee device or an organizer device sent the message;
in response to determining that the message is received from an attendee device, sending the message to one or more organizer devices; and
in response to determining that the message is received from an organizer device, sending the message to all attendee devices or a specific attendee device based on information in the message wherein the information comprises a first symbol indicating the message is to be sent to all attendee devices or a second symbol indicating the message is to be sent to a specific attendee device.

10. The computer-implemented method of claim 9, comprising:
determining the message includes the second symbol and an attendee identifier; and
sending the message to the specific attendee device associated with the attendee identifier and the one or more organizer devices.

11. The computer-implemented method of claim 9, comprising:
determining the message includes the second symbol followed by text information;

determining the specific attendee device based on a last received message; and sending the message to the specific attendee device and the one or more organizer devices.

12. The computer-implemented method of claim 9, comprising:

determining the message includes the first symbol, sending the message to all attendee devices, and sending the message including a broadcast identifier to one or more organizer devices.

13. The computer-implemented method of claim 9, comprising:

determining the message includes a help keyword; and sending help instructions to a device associated with the telephone number.

14. The computer-implemented method of claim 9, comprising:

determining the message includes a stop keyword; and removing a device associated with the telephone number from an attendee device list or an organizer device list.

15. The computer-implemented method of claim 9, comprising:

receiving a different message comprising a start keyword;

generating an attendee identifier for a sending device for the different message; and adding the sending device and the attendee identifier to an attendee device list as an attendee device.

16. The computer-implemented method of claim 9, comprising:

receiving a different message comprising a secret code keyword from a sending device; and adding the sending device to an organizer device list as an organizer device.

17. A non-transitory computer-readable storage medium comprising a plurality of instructions that when executed enable processing circuitry to:

receive a message addressed to a common telephone number associated with the apparatus, the common telephone number to enable communications between attendee devices and organizer devices;

determine whether the message is received from an attendee device or an organizer device based on a telephone number in a header of the message that identifies whether an attendee device or an organizer device sent the message;

in response to determining that the message is received from an attendee device, sending the message to one or more organizer devices; and in response to determining that the message is received from an organizer device, sending the message to all attendee devices or a specific attendee device based on information in the message wherein the information comprises a first symbol indicating the message is to be sent to all attendee devices or a second symbol indicating the message is to be sent to a specific attendee device.

18. The non-transitory computer-readable storage medium of claim 17, comprising the plurality of instructions that when executed enable the processing circuitry to:

determine the message includes the second symbol and an attendee identifier; and send the message to the specific attendee device associated with the attendee identifier and the one or more organizer devices.

19. The non-transitory computer-readable storage medium of claim 17, comprising the plurality of instructions that when executed enable the processing circuitry to:

determine the message includes the second symbol followed by text information;

determine the specific attendee device based on a last received message; and send the message to the specific attendee device and the one or more organizer devices.

20. The non-transitory computer-readable storage medium of claim 17, comprising the plurality of instructions that when executed enable the processing circuitry to:

determine the message includes the first symbol, send the message to all attendee devices, and send the message including a broadcast identifier to one or more organizer devices.

21. The non-transitory computer-readable storage medium of claim 17, comprising the plurality of instructions that when executed enable the processing circuitry to:

determine the message includes a help keyword; and send help instructions to a device associated with the telephone number.

22. The non-transitory computer-readable storage medium of claim 17, comprising the plurality of instructions that when executed enable the processing circuitry to:

determine the message includes a stop keyword; and remove a device associated with the telephone number from an attendee device list or an organizer device list.

23. The non-transitory computer-readable storage medium of claim 17, comprising the plurality of instructions that when executed enable the processing circuitry to:

receive a different message comprising a start keyword;

generate an attendee identifier for a sending device for the different message; and add the sending device and the attendee identifier to an attendee device list as an attendee device.

24. The non-transitory computer-readable storage medium of claim 17, comprising the plurality of instructions that when executed enable the processing circuitry to:

receive a different message comprising a secret code keyword from a sending device; and add the sending device to an organizer device list as an organizer device.

* * * * *